Jan. 26, 1954     R. A. RAMEY ET AL     2,667,071
APPARATUS FOR FORCE BALANCE
Filed July 18, 1946
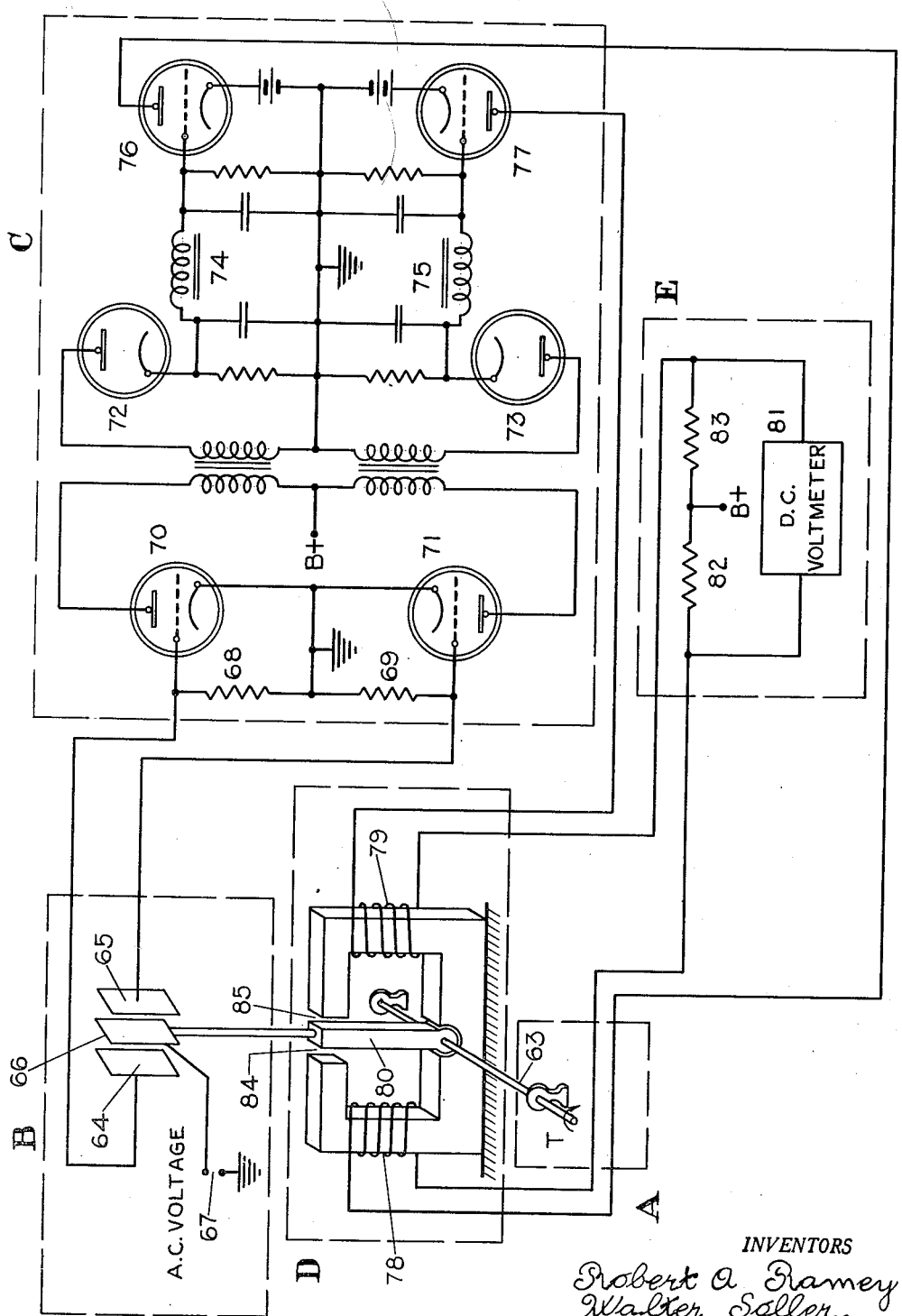
INVENTORS
Robert A. Ramey
Walter Soller,
By John Q. Brady
Attorney Patented Jan. 26, 1954

2,667,071

UNITED STATES PATENT OFFICE 2,667,071

APPARATUS FOR FORCE BALANCE

Robert A. Ramey and Walter Soller, Cincinnati, Ohio

Application July 18, 1946, Serial No. 684,606

7 Claims. (Cl. 73—133)

Our invention is directed to electrical control systems, and more particularly, to an apparatus for indicating forces by electrical quantities.

One of the objects of our invention is to provide an apparatus which is a force balance system in which electrical quantities are made to vary functionally with forces exerted on a part of the apparatus.

Another object of our invention is to provide a highly sensitive force balance system in which electrical quantities can be made to vary functionally with forces of small magnitude.

Still another object of our invention is to provide an apparatus which is a force balance system in which electrical quantities produce a counterforce for continuously balancing the exerted force on a part of the apparatus.

A still further object of our invention is to provide an apparatus which is a force balance system in which electrical quantities produce a counterforce for continuously balancing the exerted force on part of the apparatus allowing this part of the apparatus to be displaced as little as desirable.

Still another object of our invention is to provide an apparatus for amplifying direct currents in a force balancing system.

Another object of our invention is to provide a force balancing system with apparatus comprising:

A. A force structure which is a means of having a force exerted on a part of the apparatus;

B. A displacement measuring device which is a means for obtaining an electrical quantity varying with the displacement of this force structure;

C. An amplifier which is a means for amplifying the electrical quantity produced in this displacement measuring device;

D. A force balancing device which is a means of transforming this amplified electrical quantity to produce a counterforce which balances the exerted force;

E. An indicating instrument or output means which is a means of indicating the amplified electrical quantity or utilizing the electrical energy as a known function of the exerted force; and which may provide that, by varying the sensitivity of the displacement measuring device and the amplification of the amplifier, the displacement can be made as small as desirable.

Other and further objects of our invention reside in the structure of apparatus for effecting force balance as set forth more fully in the specification hereinafter following by reference to the accompanying drawing which shows the application of our invention to a magnetic force balance system.

The drawing shows a schematic layout of the electromagnetic force balance of our invention. The units will hereinafter be explained to clearly set forth the operating principles of the force balance systems covered by our invention.

In order to fully explain the operation of the apparatus of our invention the operation of the electromagnetic force balance shown in the drawing is described hereinafter with detailed reference to the numbered parts on the drawing.

The drawing shows a schematic layout of a magnetic force balance. The five basic components are: a force structure A (in this instance a rod or shaft 63 to which a torque may be applied); a displacement measuring device B (in this instance a three-plate condenser whose capacities relative to the stationary plates 64 and 65 may be varied by a displacement of this movable plate 66 toward or away from each stationary plate according as to the direction of the torque, an A. C. supply 67 and resistors 68 and 69); an amplifier C (in this instance an A. C. amplifier in the first stage (tubes 70 and 71), a rectifier stage (tubes 72 and 73) with associated filter combination 74 and 75, a D. C. amplifier stage (tubes 76 and 77) which is biased to cut off for signals produced by the displacement measuring device B in its undisplaced or mean position); a force balancing device D (in this instance an E-shaped magnetic structure with coils 78 and 79 in each outer arm of the E and a movable center arm 80); and an indicating device E (in this instance a D. C. voltmeter 81 across resistors 82 and 83 which indicates the amount of D. C. current flowing and the coil in which it flows).

A torque which is to be measured is applied to shaft 63 activating the displacement measuring device B (by causing displacement of the movable condenser plate 66 with respect to plates 64 and 65 according to the direction of the applied torque, decreasing one capacitance to ground and increasing the other and therefore allowing more current to flow through one of the resistors 68 or 69 of the symmetrical amplifier, producing a D. C. output current from the amplifier (with direction depending upon the direction of the applied torque) which flows through either coil 78 or 79 (according to the direction required to balance the applied torque) setting up a magnetic field in the air gap 84 or 85 and balancing the applied torque by the attraction force between the two magnetized surfaces on each side of the air gap, and also flowing through resistor 82 or 83 causing a voltage drop which is measured by the D. C. voltmeter 81. Since the balancing force is a function of the strength of the magnetic field and therefore a function of the coil current then the meter reading will be a function of the applied torque when balance is accomplished.

A voltage between electrostatic plates will establish a force between the plates which force may be measured by the force balancing system of our invention.

While we have described our invention in preferred embodiment, we realize that modifications in the mechanical and electrical arrangement may be made and we desire that it be understood that no limitations upon our invention are intended other than may be imposed by the scope of the appended claims.

What we claim and desire to secure by Letters Patent of the United States is as follows:

1. In a force balancing system a force structure comprising a torque arm for application of an exerted force, a displacement indicating device comprising a spacially displaceable condenser plate secured to said torque arm and movable with respect to oppositely disposed stationary condenser plates, a balanced amplifier including an electron tube system having at least cathode grid and anode electrodes with said tube system connected in a normally balanced input circuit having a central tap therein, means connecting one of said stationary condenser plates to one of the grids of the electron tube system comprising the balanced amplifier and means connecting the other stationary condenser plate with another grid of the electron tube system of the balanced amplifier, a source of alternating current connected between said displaceable condenser plate and the central tap in said balanced input circuit whereby said alternating current is variably and selectively transferred to said stationary condenser plates according to the movement of said displaceable condenser plate, an output circuit connected with said anode electrodes, and means connected in series with the output circuit of said balanced amplifier for magnetically producing a counterforce to balance the exerted force.

2. In a force balance system, a force structure comprising a magnetic angularly displaceable arm, a torque applying shaft connected with said arm for imparting angular displacement thereto in either direction, a magnetic core structure having pole pieces terminating in spacial relation to said magnetic angularly displaceable arm, a support carried by said arm, a condenser plate mounted on said support and movable between two spacially related fixed condenser plates, a balanced amplifier including an electron tube system having at least cathode grid and anode electrodes with said tube system connected in a normally balanced input circuit having a central tap therein, a source of alternating current connected between said first mentioned condenser plate and said central tap, means connecting one of said fixed condenser plates to one of the grids of said electron tube system comprising the balanced amplifier and means connecting the other fixed condenser plate with another grid of the electron tube system of the balanced amplifier, an output circuit connected with said anode electrodes, a pair of magnetic windings on said magnetic core structure, and a series connection between the output circuit of said amplifier and said pair of magnetic windings.

3. In a force balance system, a force structure comprising a magnetic angularly displaceable arm, a torque applying shaft connected with said arm for imparting angular displacement thereto in either direction, a magnetic core structure having pole pieces terminating in spacial relation to said magnetic angularly displaceable arm, a support carried by said arm, a condenser plate mounted on said support and movable between two spacially related fixed condenser plates, a balanced amplifier including an electron tube system having at least cathode grid and anode electrodes with said tube system connected in a normally balanced input circuit having a central tap therein, a source of alternating current connected between said first mentioned condenser plate and the central tap in said input circuit, means connecting one of said fixed condenser plates to one of the grids of said electron tube system comprising the balanced amplifier and means connecting the other fixed condenser plate with another grid of the electron tube system of the balanced amplifier, an output circuit connected with said anode electrodes, a pair of magnetic windings on said magnetic core structure, a series connection between the anode electrodes of said amplifier and said pair of magnetic windings, an impedance included in series between said magnetic windings, and a measuring instrument connected in shunt with said impedance.

4. In a force balance system, a force structure comprising a magnetic angularly displaceable arm, a torque applying shaft connected with said arm for imparting angular displacement thereto in either direction, a magnetic core structure having pole pieces terminating in spacial relation to said magnetic angularly displaceable arm, a support carried by said arm, a condenser plate mounted on said support and movable between two spacially related fixed condenser plates, a balanced amplifier including an electron tube system having at least cathode grid and anode electrodes with said tube system connected in a normally balanced input circuit having a central tap therein, a source of alternating current connected between said first mentioned condenser plate and the central tap in said input circuit, means connecting one of said fixed condenser plates to one of the grids of said electron tube system comprising the balanced amplifier and means connecting the other fixed condenser plate with another grid of the electron tube system of the balanced amplifier, an output circuit connected with said anode electrodes, a pair of magnetic windings on said magnetic core structure, a series connection between the output circuit of said amplifier and said pair of magnetic windings, and a measuring instrument connected in series between adjacent ends of said magnetic windings.

5. In a force balance system, a force structure comprising an angularly movable shaft subject to the application of a force to be measured, a magnetic core structure of E-type in which the central member of the E-type magnetic core structure is mounted on said shaft and is subject to angular displacement between pole pieces extending from opposite ends of said E-type magnetic core structure, an arm extending from said central member, a condenser plate carried by said arm, a pair of spacially related fixed condenser plates mounted on opposite sides of the aforesaid condenser plate, a balanced amplifier including an electron tube system having at least cathode grid and anode electrodes with said tube system connected in a normally balanced input circuit having a central tap therein, a source of alternating current connected between said first mentioned condenser plate and said central tap in said input circuit, means connecting one of said fixed condenser plates to one of the grids of said electron tube system comprising the balanced amplifier and means connecting the other fixed condenser plate with another grid of the electron tube system of the balanced amplifier, an output circuit connected with said anode electrodes, and magnetic operating windings on said E-type magnetic core structure electrically connected in series with said output circuit.

6. In a force balance system, a force structure comprising an angularly movable shaft subject to the application of a force to be measured, a magnetic core structure of E-type in which the central member of the E-type magnetic core structure is mounted on said shaft and is subject to angular displacement between pole pieces extending from opposite ends of said E-type magnetic core structure, an arm extending from said central member, a condenser plate carried by said arm, a pair of spacially related fixed condenser plates mounted on opposite sides of the aforesaid condenser plate, a balanced amplifier including an electron tube system having at least cathode grid and anode electrodes with said tube system connected in a normally balanced input circuit having a central tap therein, a source of alternating current connected between said first mentioned condenser plate and said central tap in said input circuit, means connecting one of said fixed condenser plates to one of the grids of said electron tube system comprising the balanced amplifier and means connecting the other fixed condenser plate with another grid of the electron tube system of the balanced amplifier, an output circuit connected with said anode electrodes, said amplifier having an output circuit, magnetic operating windings on said E-type magnetic core structure electrically connected in series with said output circuit, and a measuring instrument electrically connected in series between said magnetic operating windings.

7. In a force balancing system, an electron tube system comprising a balanced amplifier stage including an electron tube system having at least cathode grid and anode electrodes with said tube system connected in normally balanced relation, a balanced rectifier stage connected therewith and a balanced amplifier stage connected with the output of said balanced rectifier stage, an output circuit connected with said last mentioned balanced amplifier stage, magnetic means connected in series with said last mentioned output circuit, electrostatic means connected with the grid electrodes of said first mentioned balanced amplifier stage, an electrostatic member movable relative to said electrostatic means and cooperating therewith to unbalance said first mentioned amplifier stage when displaced from a predetermined position, means whereby a displacing force may be applied to said member, said magnetic means being operatively connected to exert a restoring force on said member when energized by an unbalance of said second mentioned amplifier stage, and measuring means connected in series with said output circuit of said second mentioned balanced amplifier stage and operating to indicate the amount of unbalance thereof.

ROBERT A. RAMEY.
WALTER SOLLER.

References Cited in the file of this patent
UNITED STATES PATENTS

| Number | Name | Date |
| --- | --- | --- |
| 1,921,983 | Wittkuhns | Aug. 8, 1933 |
| 2,067,741 | Weckerly | Jan. 12, 1937 |
| 2,117,894 | Lenehan | May 17, 1938 |
| 2,136,219 | Scherbatskoy | Nov. 8, 1938 |
| 2,141,175 | Dawson | Dec. 27, 1938 |
| 2,360,751 | Ziebolz | Oct. 17, 1944 |
| 2,371,040 | Fisher et al. | Mar. 6, 1945 |
| 2,376,459 | Stevens | May 22, 1945 |